United States Patent
Lord et al.

(10) Patent No.: US 7,165,617 B2
(45) Date of Patent: Jan. 23, 2007

(54) VISCOSIFIED TREATMENT FLUIDS AND ASSOCIATED METHODS OF USE

(75) Inventors: Paul D. Lord, Duncan, OK (US);
Rodney B. Waltman, Gretna, LA (US);
David W. Ritter, Katy, TX (US);
Sanjay Vitthal, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 283 days.

(21) Appl. No.: 10/899,897

(22) Filed: Jul. 27, 2004

(65) Prior Publication Data
US 2006/0032636 A1 Feb. 16, 2006

(51) Int. Cl.
*E21B 43/26* (2006.01)

(52) U.S. Cl. ............................... 166/308.5; 166/280.2; 166/283

(58) Field of Classification Search ............ None
See application file for complete search history.

(56) References Cited

U.S. PATENT DOCUMENTS

| | | | | |
|---|---|---|---|---|
| 4,887,670 | A | 12/1989 | Lord et al. | 166/281 |
| 5,373,901 | A | 12/1994 | Norman et al. | 166/300 |
| 5,393,439 | A | 2/1995 | Laramay et al. | 507/211 |
| 5,616,541 | A | 4/1997 | Dobson, Jr. et al. | 507/145 |
| 5,759,964 | A | 6/1998 | Shuchart et al. | 507/209 |
| 5,785,747 | A | 7/1998 | Vollmer et al. | 106/194.2 |
| 5,996,694 | A | 12/1999 | Dewprashad et al. | 166/294 |
| 6,100,222 | A | 8/2000 | Vollmer et al. | 507/113 |
| 6,444,316 | B1 | 9/2002 | Reddy et al. | 428/407 |
| 6,488,091 | B1 | 12/2002 | Weaver et al. | 166/300 |
| 6,527,051 | B1 | 3/2003 | Reddy et al. | 166/300 |
| 6,554,071 | B1 | 4/2003 | Reddy et al. | 166/293 |
| 6,640,898 | B2 | 11/2003 | Lord et al. | 166/300 |
| 2003/0236174 | A1 | 12/2003 | Fu et al. | 507/200 |
| 2004/0023812 | A1 | 2/2004 | England et al. | 507/100 |
| 2005/0261138 | A1* | 11/2005 | Robb et al. | 507/209 |
| 2006/0014648 | A1* | 1/2006 | Milson et al. | 507/213 |

FOREIGN PATENT DOCUMENTS

EP 0725206 A2 8/1996

OTHER PUBLICATIONS

Foreign Counterpart and Written Opinion Application No. PCT/GB2005/002906, Jul. 25, 2005.

* cited by examiner

*Primary Examiner*—Zakiya W. Bates
(74) *Attorney, Agent, or Firm*—Robert A. Kent; Fletcher, Yoder & Van Someren

(57) ABSTRACT

In one embodiment, provided is a method of fracturing a portion of a subterranean formation that comprises providing a viscosified treatment fluid comprising a single salt aqueous fluid having a density of greater than 9 pounds per gallon and a crosslinked viscosifying agent, and contacting the portion of the subterranean formation with a viscosified treatment fluid so as to create or enhance one or more fractures therein, wherein the viscosified treatment fluid is introduced into a well bore that penetrates the portion of the subterranean formation to be fractured at a surface pressure of less than about 25,000 pounds per square inch. In other embodiments, provided are methods of frac packing a subterranean formation and methods of reducing a surface pressure needed to create one or more fractures in a portion of a subterranean formation.

63 Claims, 2 Drawing Sheets

VISCOSIFIED TREATMENT FLUIDS AND ASSOCIATED METHODS OF USE

BACKGROUND

The present invention relates to methods for treating subterranean formations. More particularly, the present invention relates to methods of using viscosified treatment fluids that comprise a single salt aqueous fluid having a density of greater than about 9 pounds per gallon ("ppg").

Well stimulations, such as fracturing operations, commonly employ viscosified treatment fluids. Fracturing operations generally involve pumping a viscous fracturing fluid into a subterranean formation at a sufficient hydraulic pressure to create or enhance one or more cracks or "fractures" in the subterranean formation. The fracturing fluid generally has a viscosity sufficient to carry proppant particulates to at least one fracture, inter alia, to aid in maintaining the integrity of those fractures once the hydraulic pressure is released. Once the at least one fracture is created or enhanced and the proppant particulates are substantially in place, the viscosity of the fracturing fluid may be reduced, and the fluid recovered from the formation. Fracturing operations may be performed in a wide variety of wells, including production wells completed in oil and/or gas containing formations and in injection wells used in secondary or tertiary recovery operations.

Another well stimulation treatment that employs a viscosified treatment fluid is a frac pack operation. In a frac pack operation, a fracturing operation is combined with a gravel packing operation to provide stimulated production, and an annular gravel pack to prevent and/or reduce sand production. Gravel packing is a method of controlling formation particulates (e.g., sand) in an unconsolidated section of a subterranean formation. Unconsolidated sections of subterranean formations include those that contain loose formation particulates and those wherein the bonded formation particulates have insufficient bond strength to withstand the forces produced by the production of fluids therethrough. Generally, gravel packing involves placing a filtration bed containing gravel near the well bore in order to present a physical barrier to the transport of unconsolidated formation particulates with the production of hydrocarbons. The filtration bed may be placed by the pumping and placement of the gravel into an area adjacent to a well bore in an unconsolidated section of a subterranean formation.

The downhole pressure needed to create or enhance one or more fractures in the subterranean formation is a function of the hydrostatic pressure (e.g., the weight of the hydrostatic column) and the surface pressure, provided by the pumping equipment, less the frictional pressure losses due, in part, to the tubing and other downhole equipment as the fracturing fluid passes therethrough. Today, deeper wells are being drilled and completed. For instance, wells as deep as 30,000 feet or greater have been drilled and completed. Generally, as a well is drilled deeper into a subterranean formation, a higher downhole pressure is required to fracture the formation, which, in turn, when using conventional fracturing fluids requires there to be a greater surface pressure for the needed downhole pressures to be achieved. Furthermore, dependent upon characteristics of the well, there may be greater frictional pressure losses in certain wells, which also may require there to be a greater surface pressure, when using conventional fracturing fluids, for the needed downhole pressures to be achieved. For example, surface pressures as high as 20,000 pounds per square inch ("psi") and greater may be required when using existing treatment fluids as the deeper wells are drilled and completed. The surface pressure, however, may be limited by the pressure ratings of the surface equipment, such as the pumps, manifolds, treatment lines, wellheads, blowout preventers, and the like. For onshore operations, pumps and other surface equipment generally have a limitation of up to approximately 20,000 psi. In part, due to space limitations and the availability of flexible treatment lines with the needed increased pressure ratings, offshore operations currently may be limited to surface pressures of up to approximately 15,000 psi. In addition, to the availability of surface equipment with increased pressure ratings, another drawback to increasing surface pressure is that equipment with increased pressure ratings may add undesirable expenses to a fracturing or frac packing operation.

Another way to achieve the higher downhole pressures required for fracturing a subterranean formation in the deeper wells is to use a more dense treatment fluid than is typically used in fracturing and/or frac pack operations so that a higher hydrostatic pressure may be achieved. Furthermore, an increase in hydrostatic pressure may achieve the needed downhole pressure without an undesirable increase in surface pressures. Conventional viscosified treatment fluids used in these operations may be formulated using low concentration salt brines having a density of less than about 9 ppg. To achieve the desired viscosity of the viscosified treatment fluid, inter alia, for proppant particulate transport and to reduce leak off into the formation, the viscosified treatment fluid further may contain a viscosifying agent, such as water-soluble polymers (e.g., guar gums, cellulose derivatives, biopolymers, and the like). Viscosified treatment fluids that comprise single salt aqueous fluids with a greater density than typically used in fracturing and/or frac packing operation have been used heretofore to provide fluid loss control in subterranean operations. These fluids typically comprise a single salt aqueous fluid having a density of greater than about 9 ppg, a non-crosslinked viscosifying agent, and other conventional components. Alternatively, the viscosifying agent may be crosslinked. However, these viscosified treatment fluids that comprise a single salt aqueous fluid having a density of greater than about 9 ppg have not been used heretofore in fracturing and/or frac packing operations.

SUMMARY

The present invention relates to methods for treating subterranean formations. More particularly, the present invention relates to methods of using viscosified treatment fluids that comprise a single salt aqueous fluid having a density of greater than about 9 pounds per gallon ("ppg").

In one embodiment, the present invention provides a method of fracturing a portion of a subterranean formation that comprises providing a viscosified treatment fluid comprising a single salt aqueous fluid having a density of greater than 9 pounds per gallon and a crosslinked viscosifying agent, and contacting the portion of the subterranean formation with a viscosified treatment fluid so as to create or enhance one or more fractures therein, wherein the viscosified treatment fluid is introduced into a well bore that penetrates the portion of the subterranean formation to be fractured at a surface pressure of less than about 25,000 pounds per square inch.

In another embodiment, the present invention provides a method of frac packing a subterranean formation that comprises providing a viscosified treatment fluid comprising a single salt aqueous fluid having a density of greater than 9 pounds per gallon, a crosslinked viscosifying agent, and gravel, and contacting the portion of the subterranean formation with a viscosified treatment fluid so as to create or enhance one or more fractures therein, wherein the viscosified treatment fluid is introduced into a well bore that penetrates the portion of the subterranean formation to be fractured at a surface pressure of less than about 25,000 pounds per square inch.

In another embodiment, the present invention provides a method of reducing a surface pressure needed to create one or more fractures in a portion of a subterranean formation that comprises using a viscosified treatment fluid to create or enhance one or more fractures in the portion of the subterranean formation, the viscosified treatment fluid comprising a single salt aqueous fluid having a density of greater than 9 pounds per gallon and a crosslinked viscosifying agent.

The features and advantages of the present invention will be readily apparent to those skilled in the art upon a reading of the description of the embodiments that follows.

BRIEF DESCRIPTION OF THE DRAWINGS

A more complete understanding of the present disclosure and advantages thereof may be acquired by referring to the following description taken in conjunction with the accompanying drawings, wherein.

Figure 1:
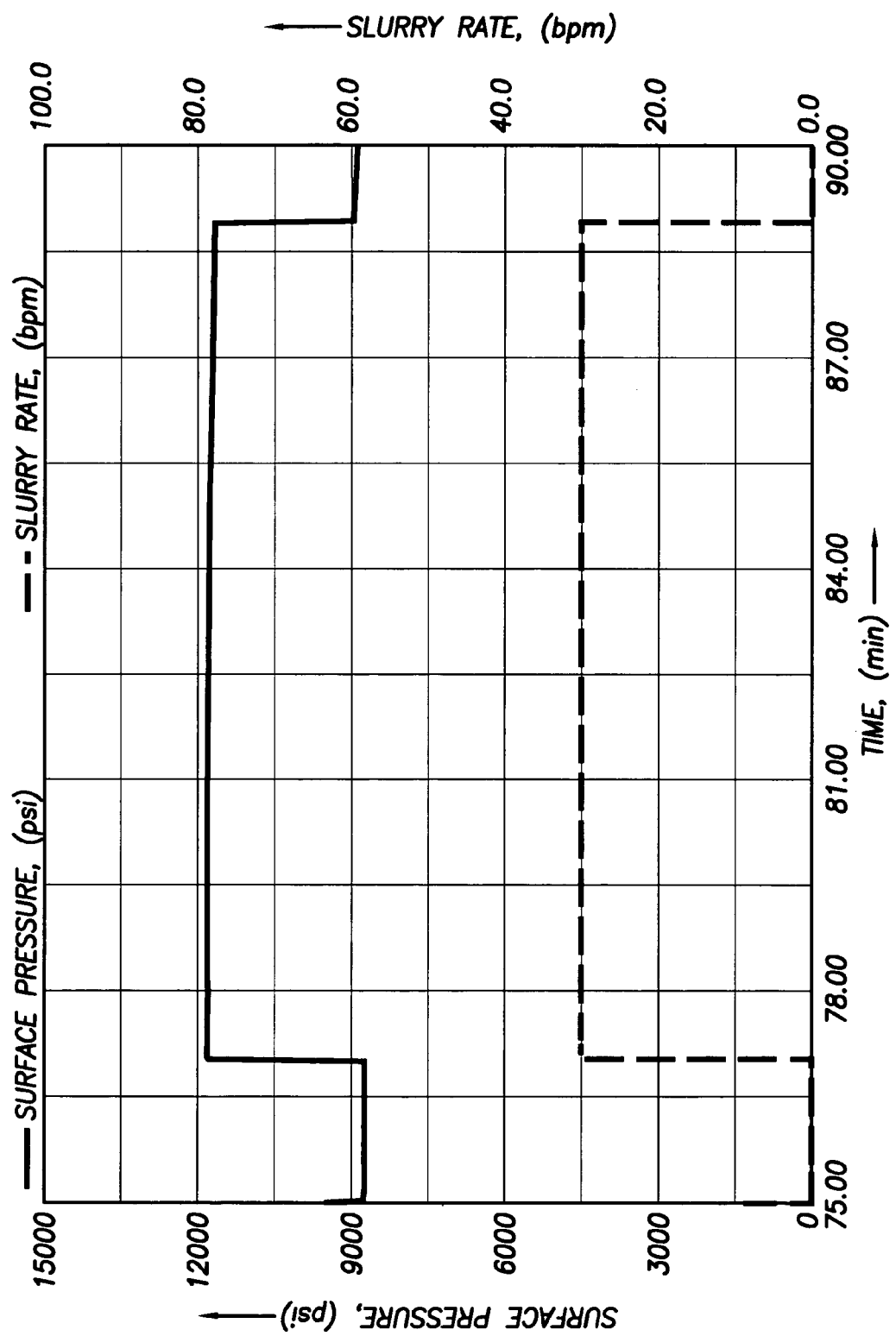
FIG. 1 is a plot of surface pressure and slurry rate versus time for a simulated hydraulic fracturing operation utilizing a prior art viscosified treatment fluid.

While the present invention is susceptible to various modifications and alternative forms, specific embodiments thereof have been shown by way of example in the figures and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates to methods for treating subterranean formations. More particularly, the present invention relates to methods of using viscosified treatment fluids that comprise a single salt aqueous fluid having a density of greater than about 9 pounds per gallon ("ppg").

The viscosified treatment fluids of the present invention generally comprise a single salt aqueous fluid having a density of greater than about 9 ppg and a crosslinked viscosifying agent. Because the viscosified treatment fluids use a more dense aqueous fluid than may be conventionally used in fracturing and frac packing operations, the viscosified treatment fluids may be used in operations where it is desired to reduce the required surface pressure of the operation. The surface pressure may be reduced because of the increased hydrostatic pressure associated with the denser fluid. Optionally, the viscosified treatment fluids further may comprise proppant particulates, breakers, pH buffers, pH adjusting agents, and catalysts. Furthermore, a variety of additional additives suitable for use in the chosen operation may be included in the viscosified treatment fluid as desired.

Generally, the single salt aqueous fluid of the viscosified treatment fluids of the present invention may be any suitable single salt aqueous fluid that has a sufficient density so that the required downhole pressure may be achieved without exceeding the surface pressure limits of the surface equipment. In some embodiments, the single salt aqueous fluid has a density of greater than about 9 ppg. In another embodiment, the single salt aqueous fluid has a density of greater than about 10 ppg. In another embodiment, the single salt aqueous fluid has a density of greater than about 11 ppg. Generally, the single salt aqueous fluid comprises water and a salt. Other components may be present as well as long as these components do not undesirably interact with the viscosified treatment fluid. The water may be from any source provided that it does not contain an excess of compounds that may adversely affect other components of the single salt aqueous fluid or the viscosified treatment fluid. Suitable salts may comprise lithium, sodium, potassium, cesium, magnesium, calcium, or zinc cations and chloride, bromide, iodide, formate, nitrate, acetate, cyanate, thiocynate, or zinc complex anions. Examples of suitable salts that comprise the above-listed anions and cations include, but are not limited to, lithium bromide, lithium chloride, lithium formate, lithium nitrate, calcium bromide, calcium chloride, calcium nitrate, calcium formate, sodium bromide, sodium chloride, sodium formate, sodium nitrate, potassium chloride, potassium bromide, potassium nitrate, potassium formate, cesium nitrate, cesium formate, cesium chloride, cesium bromide, magnesium chloride, magnesium bromide, zinc chloride, and zinc bromide. The particular salt and concentrations thereof in the single salt aqueous fluid may be adjusted for, among other things, given equipment limitations and/or desired surface pressures.

Suitable crosslinked viscosifying agents that may be used in the viscosified treatment fluids of the present invention include a wide variety of viscosifying agents that may impart increased viscosity to aqueous-based fluids when crosslinked. Examples of suitable viscosifying agents include, but are not limited to, galactomannan gums, galactomannan gum derivatives, cellulose derivatives, xanthan gums, scleroglucan, succinoglycan, and combinations thereof. Suitable galactomannan gums include, but are not limited to, gum arabic, gum ghatti, gum karaya, tamarind gum, tragacanth gum, guar gum, locust bean gum, and the like. Suitable galactomannan gum derivatives include, but are not limited to guar gum derivatives, such as hydroxypropylguar ("HPG"), carboxymethylhydroxypropylguar ("CMHPG"), and carboxymethylguar ("CMG"). Suitable cellulose derivatives, include, but are not limited to, hydroxyethylcellulose ("HEC"), grafted hydroxyethylcellulose, carboxymethylcellulose, and carboxymethylhydroxyethyl cellulose. In other embodiments, the viscosifying agent may be depolymerized. The term "depolymerized," as used herein, generally refers to a decrease in the molecular weight of the viscosifying agent. Depolymerized polymers are described in U.S. Pat. No. 6,488,091, the relevant disclosure of which is incorporated herein by reference.

The viscosifying agent may be crosslinked by any suitable crosslinking agent or method. In some embodiments, a crosslinking agent may be utilized to crosslink the viscosifying agent to form the crosslinked viscosifying agent. In certain embodiments, the viscosified treatment fluids of the present invention may be formed by contacting a single salt aqueous fluid containing a viscosifying agent with a crosslinking agent, and allowing a crosslinked gelling agent to form. A variety of crosslinking agents are suitable for use in crosslinking the viscosifying agents of the present invention. Examples of suitable crosslinking agents include, but are not limited to, borate releasing compounds and compounds that release transition metal ions when dissolved in an aqueous liquid. Suitable borate releasing compounds include, but are not limited to, boric acid, disodium octaborate tetrahydrate, sodium diborate, ulexite, and colemanite. An example of a suitable borate releasing compound is commercially available under the trade name "HMP™ Link" crosslinker from Halliburton Energy Services, Duncan, Okla. Another example of a suitable borate releasing compound is commercially available under the trade name "CL-38™" delayed borate crosslinker from Halliburton Energy Services, Duncan, Okla. Suitable compounds that release transition metal ions, include, but are not limited to, compounds capable of supplying zirconium ions such as, for example, zirconium lactate, zirconium lactate triethanolamine, zirconium carbonate, zirconium acetylacetonate, and zirconium diisopropylamine lactate; compounds capable of supplying titanium ions such as, for example, titanium ammonium lactate, titanium triethanolamine, titanium acetylacetonate; aluminum compounds such as, for example, aluminum lactate or aluminum citrate; compounds capable of supplying iron ions, such as, for example, ferric chloride; compounds capable of supplying chromium ion such as, for example, chromium III citrate; or compounds capable of supplying antimony ions. Generally, the crosslinking agent, in some embodiments, may be added to the single salt aqueous fluid containing the viscosifying agent in an amount sufficient, inter alia, to provide the desired degree of crosslinking. One of ordinary skill in the art, with the benefit of this disclosure, should be able to determine the appropriate amount and type of crosslinking agent to include for a particular application.

The viscosifying agent should be added to the single salt aqueous fluid in an amount sufficient to form the desired viscosified treatment fluid. As one of ordinary skill in the art will appreciate, the amount of the viscosifying agent to include will depend upon a number of factors, including the particular viscosifying agent chosen, downhole temperatures, pH, well conditions, and the desired viscosity of the fluid. In some embodiments, the viscosifying agent may be added to the single salt aqueous fluid in an amount in the range of from about 10 lbs to about 200 lbs per 1000 gallons of the single salt aqueous fluid. In other embodiments, the viscosifying agent may be added to the single salt aqueous fluid in an amount in the range of from about 15 lbs to about 80 lbs per 1000 gallons of the single salt aqueous fluid. As will be discussed in more detail below, the viscosifying agent, in some embodiments, first may be prepared in a treatment fluid concentrate prior to its combination with the single salt aqueous fluid.

The viscosified treatment fluids optionally may comprise proppant particulates suitable for use in subterranean applications. Suitable proppant particulates include, but are not limited to, gravel, natural sand, quartz sand, particulate garnet, glass, ground walnut hulls, nylon pellets, aluminum pellets, bauxite, ceramics, polymeric materials, combinations thereof, and the like. One having ordinary skill in the art, with the benefit of this disclosure, will recognize the appropriate type, size, and amount of proppant particulates to use in conjunction with a viscosified treatment fluid of the present invention to achieve a desired result. In certain embodiments, the proppant particulates used may be included in a viscosified treatment fluid of the present invention to form a gravel pack downhole or as a proppant in fracturing operations. In some embodiments, these particulates may be coated with resins, tackifiers, surface modification agents, or combinations thereof, e.g., to consolidate the particulates downhole. If used, these coatings should not undesirably interact with the proppant particulates are any other components of the viscosified treatment fluids of the present invention.

The viscosified treatment fluids of the present invention optionally may comprise a pH buffer. The pH buffer may be included in the viscosified treatment fluids of the present invention to maintain pH in a desired range, inter alia, to enhance the stability of the viscosified treatment fluid. Examples of suitable pH buffers include, but are not limited to, sodium carbonate, potassium carbonate, sodium bicarbonate, potassium bicarbonate, sodium or potassium diacetate, sodium or potassium phosphate, sodium or potassium hydrogen phosphate, sodium or potassium dihydrogen phosphate, sodium borate, sodium or ammonium diacetate, sulfamic acid, and the like. The pH buffer may be present in a viscosified treatment fluid of the present invention in an amount sufficient to maintain the pH of the treatment fluid at a desired level. One of ordinary skill in the art, with the benefit of this disclosure, will recognize the appropriate pH buffer and amount of pH buffer to use for a chosen application.

Optionally, the viscosified treatment fluids of the present invention further may include pH-adjusting compounds for adjusting the pH of the viscosified treatment fluid, inter alia, to a desired pH for crosslinking and/or enhance hydration of the viscosifying agent. Suitable pH-adjusting compounds include any pH-adjusting compound that does not adversely react with the other components of the viscosified treatment fluid. Examples of suitable pH-adjusting compounds include, but are not limited to, sodium hydroxide, potassium hydroxide, lithium hydroxide, sodium carbonate, potassium carbonate, fumaric acid, formic acid, acetic acid, acetic anhydride, hydrochloric acid, hydrofluoric acid, hydroxyfluoboric acid, polyaspartic acid, polysuccinimide, ammonium diacetate, sodium diacetate, and sulfamic acid. The appropriate pH-adjusting compound and amount thereof may depend upon the formation characteristics and conditions, the viscosifying agent chosen, and other factors known to individuals skilled in the art with the benefit of this disclosure. For example, where a borate-releasing compound is utilized as the crosslinking agent, the pH of the viscosified treatment fluids of the present invention should be adjusted to above about 8 to about 12 to facilitate the crosslink of the viscosifying agent. Those skilled in the art, with the benefit of this disclosure, will be able to adjust the pH range in the viscosified aqueous fluids of the present invention as desired.

In some applications, after the viscosified treatment fluid has performed its desired function, its viscosity may be reduced. For example, in subterranean treatments and operations, once the viscosity is reduced, the viscosified treatment fluid of the present invention may be flowed back to the surface, and the well may be returned to production. The viscosity of the viscosified treatment fluids may be reduced by a variety of means. In some embodiments, breakers capable of reducing the viscosity of the viscosified treatment fluids at a desired time may be included in the viscosified treatment fluid to reduce the viscosity thereof. In other embodiments, delinkers capable of lowering the pH of the viscosified treatment fluids at a desired time may be included in the viscosified treatment fluid to reduce the viscosity thereof.

In some embodiments, the viscosified treatment fluids of the present invention further may comprise a breaker. Any breaker that is able to reduce the viscosity of the viscosified treatment fluids when desired is suitable for use in the compositions and methods of the present invention. In certain embodiments, delayed gel breakers that will react with the viscosified treatment fluids after desired delay periods may be used. Suitable delayed gel breakers may be materials that are slowly soluble in a viscosified treatment fluid. Examples of suitable delayed breakers include, but are not limited to, enzyme breakers, such as alpha and beta amylases, amyloglucosidase, invertase, maltase, cellulase, and hemicellulase; acids, such as maleic acid and oxalic acid; and oxidizing agents, such as sodium chlorite, sodium bromate, sodium persulfate, ammonium persulfate, magnesium peroxide, lactose, ammonium sulfate, and triethanol amine. An example of a suitable delayed gel breaker is commercially available under the trade name "VICON NF™" breaker from Halliburton Energy Services, Duncan, Okla. In some embodiments, these delayed breakers can be encapsulated with slowly water-soluble or other suitable encapsulating materials. Examples of water-soluble and other similar encapsulating materials that may be suitable include, but are not limited to, porous solid materials such as precipitated silica, elastomers, polyvinylidene chloride (PVDC), nylon, waxes, polyurethanes, polyesters, crosslinked partially hydrolyzed acrylics, other polymeric materials, and the like. The appropriate breaker and amount thereof may depend upon the formation characteristics and conditions, the viscosifying agent chosen, the pH of the viscosified treatment fluid, and other factors known to individuals skilled in the art with the benefit of this disclosure. In some embodiments, the breaker may be included in a viscosified treatment fluid of the present invention in an amount in the range of from about 0.1 gallons to about 100 gallons per 1000 gallons of the single salt aqueous fluid.

In some embodiments, the viscosified treatment fluids of the present invention may comprise a delinker that is capable of lowering the pH of the viscosified treatment fluid at a desired time causing the crosslinks of the viscosifying agent to reverse. For example, when certain crosslinking agents, such as borate-releasing compounds, are used, the crosslinks may be reversed (or delinked) by lowering the pH of the viscosified treatment fluid to below about 8. The delinker may comprise encapsulated pH-adjusting agents or acid-releasing degradable materials capable of reacting over time in an aqueous environment to produce an acid. In certain embodiments, suitable pH-adjusting agents include, but are not limited to, fumaric acid, formic acid, acetic acid, acetic anhydride, hydrochloric acid, hydrofluoric acid, hydroxyfluoboric acid, polyaspartic acid, polysuccinimide, combinations thereof, and the like. In these embodiments, the pH-adjusting agents may be encapsulated using any suitable encapsulation technique. Exemplary encapsulation methodology is described in U.S. Pat. Nos. 5,373,901; 6,444,316; 6,527,051; and 6,554,071, the relevant disclosures of which are incorporated herein by reference. Acid-releasing degradable materials also may be included in the viscosified treatment fluids to decrease the pH of the viscosified treatment fluid. Suitable acid-releasing degradable materials that may be used in conjunction with the present invention are those materials that are substantially water insoluble such that they degrade over time, rather than instantaneously, in an aqueous environment to produce an acid. Examples of suitable acid-releasing degradable materials include orthoesters; poly(ortho esters); lactides; poly(lactides); glycolides; poly(glycolides); substituted lactides wherein the substituted group comprises hydrogen, alkyl, aryl, alkylaryl, acetyl heteroatoms and mixtures thereof; substantially water insoluble anhydrides; and poly(anhydrides). Depending on the timing required for the reduction of viscosity, the acid-releasing degradable material may provide a relatively fast break or a relatively slow break, depending on, for example, the particular acid-releasing degradable material chosen. Materials suitable for use as an acid-releasing degradable material of the present invention may be considered degradable if the degradation is due, inter alia, to chemical and/or radical processes, such as hydrolysis, oxidation, or enzymatic decomposition. The inclusion of a particular delinker and amount thereof may depend upon the formation characteristics and conditions, the viscosifying agent chosen, the particular crosslinking agent, and other factors known to individuals skilled in the art with the benefit of this disclosure. In some embodiments, the delinker may be included in a viscosified treatment fluid of the present invention in an amount in the range of from about 0.01 pounds to about 100 pounds per 1000 gallons of the single salt aqueous fluid.

The viscosified treatment fluids of the present invention optionally may comprise a catalyst. The use of a catalyst is optional, but a catalyst may be included in the viscosified treatment fluids of the present invention to activate the breaker dependent, inter alia, upon the pH of the viscosified treatment fluid and formation conditions. Examples of suitable catalysts include, but are not limited to, transition metal catalysts, such as copper and cobalt acetate. An example of a suitable cobalt acetate catalyst is available under the trade name "CAT-OS-1" catalyst from Halliburton Energy Services, Duncan, Okla. In some embodiments, the catalyst may be included in a viscosified treatment fluid of the present invention in an amount in the range of from about 0.01 pounds to about 50 pounds per 1000 gallons of the single salt aqueous fluid.

Additional additives may be added to the viscosified treatment fluids of the present invention as deemed appropriate for a particular application by one skilled in the art, with the benefit of this disclosure. Examples of such additives include, but are not limited to, weighting agents, biocides, gel stabilizers, surfactants, scale inhibitors, anti-foaming agents, foaming agents, fluid loss control additives, shale swelling inhibitors, radioactive tracers, combinations thereof, and numerous other additives suitable for use in subterranean operations.

The viscosified treatment fluids of the present invention may be prepared by any suitable method. In some embodiments, the viscosified treatment fluids of the present invention may be produced at the well site. As an example, of such an on-site method, a viscosifying agent may be combined with a single salt aqueous fluid, as discussed above. Furthermore, additional additives, as discussed above may be combined with the single salt aqueous fluid as desired. To form a viscosified treatment fluid of the present invention, a crosslinking agent, as discussed above, may be added to the single salt aqueous fluid that comprises the viscosifying agent and other suitable additives.

In other embodiments, a treatment fluid concentrate may prepared by combining a base fluid (e.g., water) and a viscosifying agent, the treatment fluid concentrate comprising a base fluid and a viscosifying agent. Generally, the water in the treatment fluid concentrate may be fresh water or water containing a relatively small amount of a dissolved salt or salts. In other embodiments, the water in the treatment fluid concentrate may be the single salt aqueous fluid. The viscosifying agent may be present in the treatment fluid concentrate in an amount in the range of from about 40 lbs to about 200 lbs per 1000 gallons of the base fluid. Furthermore, additional additives, discussed above, that may be included in the viscosified treatment fluids of the present invention may be added to the treatment fluid concentrate as desired. In some embodiments, the treatment fluid concentrate may be prepared at an offsite manufacturing location and may be stored prior to use. Such methods may be preferred, for example, when these treatment fluid concentrates are to be used in offshore applications, e.g., because the equipment and storage volumes may be reduced. After preparing the treatment fluid concentrate, the single salt aqueous fluid, described above, may be combined with the treatment fluid concentrate. When the treatment fluid concentrate is mixed with the single salt aqueous fluid, no hydration time may be required because the viscosifying agent may already be substantially fully hydrated. Furthermore, the additional additives, discussed above, may be combined with the single salt aqueous fluid as desired. To form the viscosified treatment fluid of the present invention, a crosslinking agent, as discussed above, may be added to the single salt aqueous fluid that comprises the viscosifying agent and other suitable additives.

The viscosified treatment fluids of the present invention may be utilized for carrying out a variety of subterranean well treatments and operations, including, but not limited to, fracturing treatments operations and frac pack operations. In some embodiments, where the viscosified treatment fluids of the present invention are used with fracturing operations, a portion of the subterranean formation may be contacted with the viscosified treatment fluids so as to create or enhance one or more fractures therein, the viscosified treatment fluids comprising a single salt aqueous fluid and a crosslinked viscosifying agent. The desired formulation of the viscosified treatment fluids would be determined to obtain desired rheology and pressures. The particular salt in the single salt aqueous fluid and concentration thereof may be adjusted to optimize for equipment limitations or desired surface treating pressures of less than about 25,000 psi, in other embodiments, less than about 20,000 psi, and in yet other embodiments, less than about 15,000 psi. As those of ordinary skill in the art will appreciate, the viscosified treatment fluids of the present invention further may comprise proppant particulates. At a chosen time, or after a desired time, the viscosity of the viscosified treatment fluid may be reduced and the viscosified treatment fluid recovered.

In other embodiments, wherein the viscosified treatment fluids of the present invention are used with frac pack operations, a portion of the subterranean formation may be contacted with the viscosified treatment fluids so as to so as to create or enhance one or more fractures therein, the viscosified treatment fluids comprising a single salt aqueous fluid, a crosslinked viscosifying agent, and a proppant particulate (e.g., gravel). The desired formulation of the viscosified treatment fluids would be determined to obtain desired rheology and pressures. The particular salt in the single salt aqueous fluid and concentration thereof may be adjusted to optimize for equipment limitations or desired surface treating pressures of than about 25,000 psi, in other embodiments, less than about 20,000 psi, and in yet other embodiments, less than about 15,000 psi. At a chosen time, or after a desired time, the viscosity of the viscosified treatment fluid may be reduced and the viscosified treatment fluid recovered.

In one embodiment, the present invention provides a method of fracturing a portion of a subterranean formation that comprises providing a viscosified treatment fluid comprising a single salt aqueous fluid having a density of greater than 9 pounds per gallon and a crosslinked viscosifying agent, and contacting the portion of the subterranean formation with a viscosified treatment fluid so as to create or enhance one or more fractures therein, wherein the viscosified treatment fluid is introduced into a well bore that penetrates the portion of the subterranean formation to be fractured at a surface pressure of less than about 25,000 pounds per square inch.

In another embodiment, the present invention provides a method of frac packing a subterranean formation that comprises providing a viscosified treatment fluid comprising a single salt aqueous fluid having a density of greater than 9 pounds per gallon, a crosslinked viscosifying agent, and gravel, and contacting the portion of the subterranean formation with a viscosified treatment fluid so as to create or enhance one or more fractures therein, wherein the viscosified treatment fluid is introduced into a well bore that penetrates the portion of the subterranean formation to be fractured at a surface pressure of less than about 25,000 pounds per square inch.

In another embodiment, the present invention provides a method of reducing a surface pressure needed to create one or more fractures in a portion of a subterranean formation that comprises using a viscosified treatment fluid to create or enhance one or more fractures in the portion of the subterranean formation, the viscosified treatment fluid comprising a single salt aqueous fluid having a density of greater than 9 pounds per gallon and a crosslinked viscosifying agent.

To facilitate a better understanding of the present invention, the following examples of certain embodiments are given. In no way should the following examples be read to limit, or define, the scope of the invention.

EXAMPLES

Example 1

Rheological tests were performed on a fluid sample that was prepared as follows. Fluid Sample No. 1 was prepared by adding 1 liter of an 11.5 ppg sodium bromide brine to a blender jar. With agitation, 8.75 ml of a treatment fluid concentrate (4 pounds HPG per gallon) was added to produce an HPG gel. Next, a surfactant was added to the HPG gel in an amount of 0.12 grams. The surfactant is commercially available under the trade name "LOSURF-2000S™" surfactant from Halliburton Energy Services, Duncan, Okla. For hydration of the HPG, a buffer, ammonium diacetate, was added to the blender jar with agitation in an amount of 0.25 ml to adjust the pH of the HPG gel to about 7. Next, with agitation, a potassium carbonate buffer in an amount of 2.25 ml and a sodium hydroxide buffer in an amount of 2.25 ml was added to the blender jar with agitation to adjust the pH of the HPG gel to about 11.7 for crosslinking. Next, with agitation, 1.2 grams of a gel stabilizer, sodium thiosulfate, was added to the blender jar. With agitation, 3 ml of a crosslinking agent, CL-38™ delayed borate crosslinker, was added to the HPG gel and allowed to mix for 30 seconds to form a crosslinked HPG gel, Fluid Sample No. 1.

Once prepared, a 35 ml sample of Fluid Sample No. 1 was transferred immediately to the R1 rotor cup of a Fann Model 50C viscometer. The rotor cup containing the sample was attached to the viscometer equipped with a B5X bob. The sample was pressurized to 350 psi and immersed in the preheated bath on the viscometer. To determine the viscosities of the sample, a nonscanning shear rate procedure was utilized. The rotor cup was set in motion at a constant rate of about 95 rpm providing a shear rate of about 81 sec$^{-1}$ on the sample. The sample was brought up to about 275° F. and average viscosities and shear rates of the sample were measured. The results of these tests are listed below in Table 1.

TABLE 1

| Elapsed Time (min) | Sample Temperature (° F.) | Shear Rate (sec$^{-1}$) | Shear Stress | Average Viscosity (centipoise) at 80 sec$^{-1}$ |
|---|---|---|---|---|
| 1 | 88.8 | 81 | 12.71 | 76.5 |
| 11 | 188.8 | 81 | 139.04 | 836.5 |
| 21 | 264.7 | 81 | 136.51 | 821.6 |
| 31 | 271.8 | 81 | 139.46 | 839.0 |
| 41 | 272.6 | 81 | 130.81 | 787.5 |
| 51 | 273.1 | 81 | 125.51 | 755.7 |
| 61 | 273.9 | 81 | 122.60 | 738.1 |
| 71 | 273.8 | 81 | 120.41 | 724.8 |
| 81 | 273.8 | 81 | 131.88 | 793.9 |
| 91 | 273.7 | 81 | 133.41 | 803.1 |
| 101 | 273.7 | 81 | 127.33 | 766.5 |
| 111 | 273.4 | 81 | 122.11 | 734.4 |
| 121 | 273.5 | 81 | 123.11 | 740.6 |
| 130 | 273.6 | 81 | 117.22 | 705.1 |

Therefore, Example 1 illustrates that a viscosified treatment fluid of the present invention comprising a single salt aqueous fluid and a crosslinked viscosifying agent may have desirable rheological properties for use in subterranean operations.

Example 2

Additional rheological tests were performed on a different fluid sample. Fluid Sample No. 2 was prepared as follows. A 12.5 ppg sodium bromide brine was added in an amount of 1 liter to a blender jar. With agitation, 4.8 grams of CMHPG was added to produce a CMHPG gel. Next, a surfactant, LOSURF-2000S, was added to the CMHPG gel in an amount of 0.12 grams. For hydration of the CMHPG, a buffer, ammonium diacetate, was added to the blender jar with agitation in an amount of 0.25 ml to adjust the pH of the CMHPG gel to about 7. Next, with agitation, a potassium carbonate buffer in an amount of 2.25 ml and a sodium hydroxide buffer in an amount of 0.7 ml was added to the blender jar with agitation to adjust the pH of the CMHPG gel to about 10.18 for crosslinking. Next, with agitation, 2.18 grams of a gel stabilizer, sodium thiosulfate, was added to the blender jar. With agitation, 0.8 ml of a crosslinking agent was added to the CMHPG gel and allowed to mix for 30 seconds to form a crosslinked CMHPG gel, Fluid Sample No. 2. The crosslinking agent added was a zirconate metal cross linking agent that is commercially available under the trade name "CL-24™" crosslinker from Halliburton Energy Services, Duncan, Okla.

Once prepared, a 35 ml aliquot of Sample No. 2 was transferred immediately to the R1 rotor cup of a Fann Model 50C viscometer. The rotor cup containing the sample was attached to the viscometer equipped with a B5X bob. The fluid sample was pressurized to 350 psi and immersed in the preheated bath on the viscometer. The rotor cup was set in motion at 88 rpm providing a shear rate of 74 sec$^{-1}$ on the sample. The viscometer was programmed to maintain a constant 88 rpm on the sample, except when performing a shear rate sweep. A sheer rate sweep of 118 rpm, 88 rpm, 59 rpm, 29 rpm, 59 rpm, 88 rpm, and 118 rpm was programmed to occur ever 15 minutes after the sample reached a temperature of about 325° F. The shear stress at each shear rate was recorded. Power-law indices, K' and n', were calculated from the shear stress versus shear rate values. These power-law indices are defined in the American Petroleum Institute's publication RP39, 3d edition, Section 6. The results of these calculations and apparent viscosities of Fluid Sample No. 2 are listed below in Table 2.

TABLE 2

| Elapsed Time (min) | Time at Temperature (min) | Sample Temperature (° F.) | Power Law Index n' | Power Law Index K' | Apparent Viscosity (centipoise) at 40 sec$^{-1}$ | Apparent Viscosity (centipoise) at 170 sec$^{-1}$ |
|---|---|---|---|---|---|---|
| 13.52 | 3.27 | 317.6 | 0.7015 | 0.1313 | 2090.1 | 1357.0 |
| 23.53 | 13.28 | 324.0 | 0.5880 | 0.1683 | 1763.0 | 971.3 |
| 33.53 | 23.28 | 324.7 | 0.5511 | 0.1499 | 1370.4 | 715.7 |
| 43.53 | 33.28 | 324.6 | 0.5224 | 0.1349 | 1109.7 | 556.0 |
| 53.53 | 43.28 | 324.5 | 0.5121 | 0.1152 | 911.4 | 449.9 |
| 63.53 | 53.28 | 324.6 | 0.5033 | 0.0988 | 757.0 | 369.0 |
| 73.53 | 63.28 | 324.5 | 0.5023 | 0.0825 | 629.6 | 306.4 |
| 83.53 | 73.28 | 324.4 | 0.4991 | 0.0690 | 520.7 | 252.3 |
| 93.53 | 83.28 | 324.6 | 0.4950 | 0.0580 | 431.0 | 207.6 |

Thus, Example 2 indicates that a viscosified treatment fluid of the present invention comprising a single salt aqueous fluid and a crosslinked viscosifying agent may have desirable rheological properties for use in subterranean operations.

Example 3

A hydraulic fracturing operation was simulated using two different fluid samples. The simulation was performed using "FracproPT" software, commercially available from Pinnacle Technologies. The simulated formation had a bottom-hole temperature of 200° F. The simulation was performed using 26,000 feet of a 4.828 inch inside diameter workstring and a 30 barrel per minute ("bpm") pump rate to achieve a downhole pressure of 19,600 psi. The simulation determined the surface pressure required to achieve the necessary downhole pressure based, inter alia, on the hydrostatic pressure generated by the fluid sample and the associated frictional pressure losses.

Fluid Sample No. 3 (comparative) comprised a single salt aqueous fluid having a density of 8.7 ppg and crosslinked HPG present in an amount of 25 pounds per 1000 gallons of the single salt aqueous fluid. For Fluid Sample No. 3, the determined surface pressure needed to achieve the required downhole pressure was about 11,800 psi. In FIG. 1, the surface pressure and slurry rate of Fluid Sample No. 3 for the simulated hydraulic fracturing operation is plotted versus time.

Figure 2:
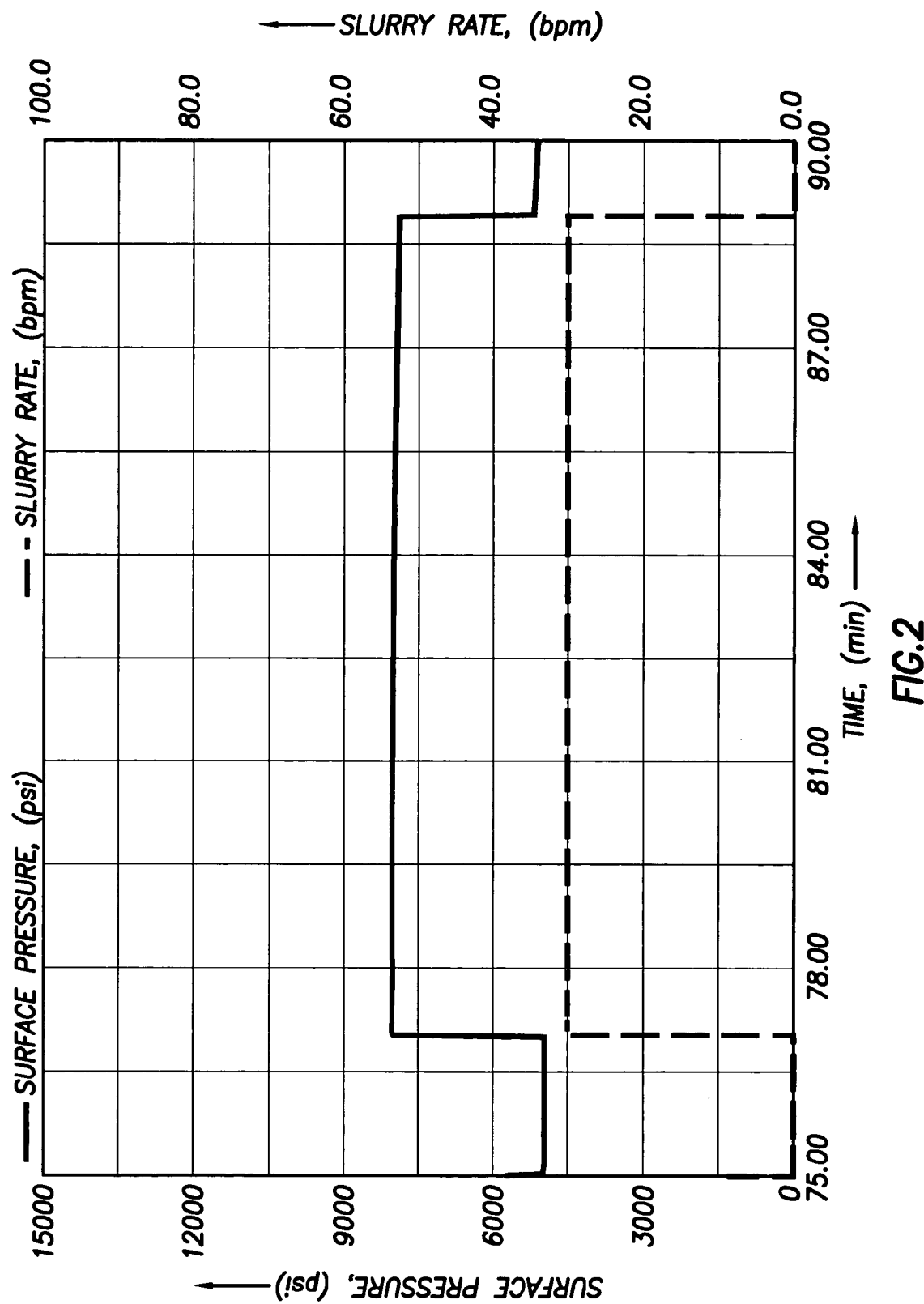
FIG. 2 is a plot of surface pressure and slurry rate versus time for a simulated hydraulic fracturing operation in accordance with one embodiment of the present invention.

Fluid Sample No. 4 comprised a single salt aqueous fluid having a density of 11.5 ppg and crosslinked HPG present in an amount of 25 pounds per 1000 gallons of the single salt aqueous fluid. For Fluid Sample No. 4, the determined surface pressure needed to achieve the required downhole pressure was about 8000 psi. In FIG. 2, the surface pressure and slurry rate of Fluid Sample No. 4 for the simulated hydraulic fracturing operation is plotted versus time.

Accordingly, Example No. 3 indicates that a viscosified treatment fluid of the present invention comprising a single salt aqueous fluid having a density of greater than about 9 ppg and a crosslinked viscosifying agent may reduce surface pressures needed in hydraulic fracturing operations.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of fracturing a portion of a subterranean formation comprising:
   providing a viscosified treatment fluid comprising a sodium bromide brine having a density of greater than about 9 pounds per gallon and a crosslinked viscosifying agent, wherein the crosslinked viscosifying agent comprises a crosslinked galactomannan gum derivative, and
   contacting the portion of the subterranean formation with the viscosified treatment fluid so as to create or enhance one or more fractures therein,
   wherein the viscosified treatment fluid is introduced into a well bore that penetrates the portion of the subterranean formation to be fractured at a surface pressure of less than about 25,000 pounds per square inch.

2. The method of claim 1 wherein the sodium bromide brine has a density of greater than about 10 pounds per gallon.

3. The method of claim 1 further comprising contacting the sodium bromide brine that comprises a viscosifying agent with a crosslinking agent to form the viscosified treatment fluid.

4. The method of claim 3 further comprising preparing the sodium bromide brine that comprises the viscosifying agent.

5. The method of claim 4 wherein the viscosifying agent is provided in a treatment fluid concentrate that comprises a base fluid and the viscosifying agent, wherein the viscosifying agent is present in an amount in the range of from about 40 pounds per 1000 gallons of the base fluid.

6. The method of claim 3 wherein the crosslinking agent comprises a borate releasing compound, a compound capable of supplying zirconium ions, a compound capable of supplying titanium ions, an aluminum compound, a compound capable of supplying iron ions, a compound capable of suppling chromium ions, or a compound capable of supplying antimony ions.

7. The method of claim 3 wherein the crosslinking agent comprises boric acid, disodium octaborate tetrahydrate, sodium diborate, ulexite, colemanite, zirconium lactate, zirconium lactate triethanolamine, zirconium carbonate, zirconium acetylacetonate, zirconium diisopropylamine lactate; titanium animonium lactate, titanium triethanolamine, titanium acetylacetonate, aluminum lactate, aluminum citrate, ferric chloride, or chromium III citrate.

8. The method of claim 3 wherein the viscosifying agent is present in the sodium bromide brine in an amount in the range of from about 10 pounds to about 200 pounds per 1000 gallons of the sodium bromide brine.

9. The method of claim 1 wherein the viscosified treatment fluid further comprises a proppant particulate.

10. The method of claim 9 wherein the proppant particulate comprises gravel, natural sand, quartz sand, particulate garnet, glass, ground walnut hulls, nylon pellets, aluminum pellets, bauxite, ceramics, polymeric materials, or a combination thereof.

11. The method of claim 9 wherein the proppant particulate is coated with a tackifier, a resin, a surface modification agent, or a combination thereof.

12. The method of claim 1 wherein the viscosified treatment fluid further comprises a pH buffer.

13. The method of claim 12 wherein the pH buffer comprises sodium carbonate, potassium carbonate, sodium bicarbonate, potassium bicarbonate, sodium diacetate, potassium diacetate, sodium phosphate, potassium phosphate, sodium hydrogen phosphate, potassium hydrogen phosphate, sodium dihydrogen phosphate, potassium dihydrogen phosphate, sodium borate, sodium diacetate, ammonium diacetate, or sulfamic acid.

14. The method of claim 12 wherein the viscosified treatment fluid further comprises a pH-adjusting compound.

15. The method of claim 14 wherein the pH-adjusting compound comprises sodium hydroxide, potassium hydroxide, lithium hydroxide, sodium carbonate, potassium carbonate, fumaric acid, formic acid, acetic acid, acetic anhydride, hydrochloric acid, hydrofluoric acid, hydroxyfluoboric acid, polyaspartic acid, polysuccinimide, ammonium diacetate, sodium diacetate, or sulfamic acid.

16. The method of claim 1 wherein the viscosified treatment fluid further comprises a breaker capable of reducing the viscosity of the viscosified treatment fluid at a desired time.

17. The method of claim 16 wherein the breaker comprises an enzyme breaker, an acid breaker, or an oxidizer.

18. The method of claim 16 wherein the breaker comprises alpha amylase, beta amylase, amyloglucosidase, invertase, maltase, cellulase, hemicellulase, maleic acid, oxalic acid, sodium chlorite, sodium bromate, sodium persulfate, ammonium persulfate, magnesium peroxide, lactose, ammonium sulfate, or triethanol amine.

19. The method of claim 16 wherein the breaker is encapsulated.

20. The method of claim 16 wherein the viscosified treatment fluid further comprises a delinker capable of lowering the pH of the viscosified treatment fluid at a desired time.

21. The method of claim 20 wherein the delinker comprises an encapsulated pH-adjusting agent or an acid-releasing degradable material.

22. The method of claim 21 wherein the pH-adjusting agent comprises fumaric acid, formic acid, acetic acid, acetic anhydride, hydrochloric acid, hydrofluoric acid, hydroxyfluoboric acid, polyaspartic acid, polysuccinimide, or a combination thereof.

23. The method of claim 21 wherein the acid-releasing degradable material comprises an orthoester; a poly(ortho ester); a lactide; a poly(lactide); a glycolide; a poly(glycolide); a substituted lactide wherein the substituted group comprises hydrogen, alkyl, aryl, alkylaryl, acetyl heteroatoms, or a mixture thereof a substantially water insoluble anhydride; or a poly(anhydride).

24. The method of claim 1 wherein the viscosified treatment fluid further comprises a catalyst.

25. The method of claim 24 wherein the catalyst is a transition metal catalyst.

26. The method of claim 1 wherein the viscosified treatment fluid further comprises a weighting agent, a biocide, a gel stabilizer, a surfactant, a scale inhibitor, an antifoaming agent, a foaming agent, a fluid loss control additive, a shale swelling inhibitor, a radioactive tracer, or a combination thereof.

27. The method of claim 1 further comprising reducing the viscosity of the viscosified treatment fluid at a desired time.

28. The method of claim 1 wherein the crosslinked galactomannan gum derivative comprises crosslinked hydroxypropylguar.

29. The method of claim 1 wherein the crosslinked galacomannan gum derivative comprises crosslinked carboxymethylhydroxypropylguar.

30. The method of claim 1 comprising lowering the pH of the sodium bromide brine for hydration of the viscosifying agent, and raising the pH of the sodium bromide brine for crosslinking of the viscosifying agent.

31. The method of claim 1, comprising adding a viscosifying agent to the sodium bromide brine, wherein the viscosifying agent is not added to the sodium bromide brine in a liquid concentrate.

32. A method of frac packing a subterranean formation comprising:
providing a viscosified treatment fluid comprising a sodium bromide brine having a density of greater than about 9 pounds per gallon, a crosslinked viscosifying agent, and gravel, wherein the crosslinked viscosifying agent comprises a crosslinked galactomannan gum derivative, and
contacting the portion of the subterranean formation with the viscosified treatment fluid so as to create or enhance one or more fractures therein,
wherein the viscosified treatment fluid is introduced into a well bore that penetrates the portion of the subterranean formation to be fractured at a surface pressure of less than about 25,000 pounds per square inch.

33. The method of claim 32 wherein the sodium bromide brine has a density of greater than about 10 pounds per gallon.

34. The method of claim 32 further comprising contacting the sodium bromide brine that comprises a viscosifying agent with a crosslinking agent to form the viscosified treatment fluid.

35. The method of claim 34 wherein the crosslinking agent comprises a borate releasing compound, a compound capable of supplying zirconium ions, a compound capable of supplying titanium ions, an aluminum compound, a compound capable of supplying iron ions, a compound capable of suppling chromium ions, or a compound capable of supplying antimony ions.

36. The method of claim 34 wherein the crosslinking agent comprises boric acid, disodium octaborate tetrahydrate, sodium diborate, ulexite, colemanite, zirconium lactate, zirconium lactate triethanolamine, zirconium carbonate, zirconium acetylacetonate, zirconium diisopropylamine lactate; titanium ammonium lactate, titanium triethanolamine, titanium acetylacetonate, aluminum lactate, aluminum citrate, ferric chloride, or chromium III citrate.

37. The method of claim 34 wherein the viscosifying agent is present in the sodium bromide brine in an amount in the range of from about 10 pounds to about 200 pounds per 1000 gallons of the sodium bromide brine.

38. The method of claim 32 wherein the viscosified treatment fluid further comprises a pH buffer.

39. The method of claim 38 wherein the pH buffer comprises sodium carbonate, potassium carbonate, sodium bicarbonate, potassium bicarbonate, sodium diacetate, potassium diacetate, sodium phosphate, potassium phosphate, sodium hydrogen phosphate, potassium hydrogen phosphate, sodium dihydrogen phosphate, potassium dihydrogen phosphate, sodium borate, sodium diacetate, ammonium diacetate, or sulfamic acid.

40. The method of claim 32 wherein the viscosified treatment fluid further comprises a pH-adjusting compound.

41. The method of claim 40 wherein the pH-adjusting compound comprises sodium hydroxide, potassium hydroxide, lithium hydroxide, sodium carbonate, potassium carbonate, fumaric acid, formic acid, acetic acid, acetic anhydride, hydrochloric acid, hydrofluoric acid, hydroxyfluoboric acid, polyaspartic acid, polysuccinimide, ammonium diacetate, sodium diacetate, or sulfamic acid.

42. The method of claim 32 wherein the viscosified treatment fluid further comprises a breaker capable of reducing the viscosity of the viscosified treatment fluid at a desired time.

43. The method of claim 42 wherein the breaker comprises an enzyme breaker, an acid breaker, or an oxidizer.

44. The method of claim 32 wherein the viscosified treatment fluid further comprises a delinker capable of lowering the pH of the viscosified treatment fluid at a desired time.

45. The method of claim 44 wherein the delinker comprises an encapsulated pH-adjusting agent or an acid-releasing degradable material.

46. The method of claim 32 wherein the viscosified treatment fluid further comprises a catalyst.

47. The method of claim 46 wherein the catalyst is a transition metal catalyst.

48. The method of claim 32 further comprising reducing the viscosity of the viscosified treatment fluid at a desired time.

49. The method of claim 32 wherein the crosslinked galactomannan gum derivative comprises crosslinked hydroxypropylguar.

50. The method of claim 32 wherein the crosslinked galacomannan gum derivative comprises crosslinked carboxymethyihydroxypropylguar.

51. The method of claim 32 comprising lowering the pH of the sodium bromide brine for hydration of the viscosifying agent, and raising the pH of the sodium bromide brine for crosslinking of the viscosifying agent.

52. A method of reducing a surface pressure needed to create one or more fractures in a portion of a subterranean formation comprising:
using a viscosified treatment fluid to create or enhance one or more fractures in the portion of the subterranean formation, the viscosified treatment fluid comprising a sodium bromide brine having a density of greater than about 9 pounds per gallon and a crosslinked viscosifying agent, wherein the crosslinked viscosifying agent comprises a crosslinked galactomannan gum derivative.

53. The method of claim 52 wherein the sodium bromide brine has a density of greater than about 10 pounds per gallon.

54. The method of claim 52 further comprising contacting the sodium bromide brine that comprises a viscosifying agent with a crosslinking agent to form the viscosified treatment fluid.

55. The method of claim 54 wherein the crosslinking agent comprises a borate releasing compound, a compound capable of supplying zirconium ions, a compound capable of supplying titanium ions, an aluminum compound, a compound capable of supplying iron ions, a compound capable of suppling chromium ions, or a compound capable of supplying antimony ions.

56. The method of claim 52 wherein the viscosified treatment fluid further comprises a pH buffer.

57. The method of claim 52 wherein the viscosified treatment fluid further comprises a pH-adjusting compound.

58. The method of claim 52 wherein the viscosified treatment fluid further comprises a breaker capable of reducing the viscosity of the viscosified treatment fluid at a desired time.

59. The method of claim 52 wherein the viscosified treatment fluid further comprises a delinker capable of lowering the pH of the viscosified treatment fluid at a desired time.

60. The method of claim 52 wherein the viscosified treatment fluid further comprises a catalyst.

61. The method of claim 52 wherein the crosslinked galactomannan gum derivative comprises crosslinked hydroxypropylguar.

62. The method of claim 52 wherein the crosslinked galactomannan gum derivative comprises crosslinked carboxymethylhydroxypropylguar.

63. The method of claim 52 comprising lowering the pH of the sodium bromide brine for hydration of the viscosifying agent, and raising the pH of the sodium bromide brine for crosslinking of the viscosifying agent.

* * * * *